Sept. 20, 1966  YUZO KAWAMURA  3,274,315
PROCESS FOR UNITIZED CONSTRUCTION OF SYNTHETIC
RESIN BOARD OR CYLINDER
Filed Feb. 25, 1963  4 Sheets-Sheet 1

INVENTOR.
YUZO KAWAMURA
BY
ATTORNEY.

United States Patent Office 3,274,315
Patented Sept. 20, 1966

3,274,315
PROCESS FOR UNITIZED CONSTRUCTION OF SYNTHETIC RESIN BOARD OR CYLINDER
Yuzo Kawamura, Toyonaka-shi, Osaka-fu, Japan, assignor to Tokan Kogyo Co., Ltd.
Filed Feb. 25, 1963, Ser. No. 260,425
3 Claims. (Cl. 264—93)

The present invention relates to a process for the production of synthetic resin board or cylinder characterized in that it produces in one operation a synthetic resin board or cylinder of desired surface the cross section of which has a configuration of spaces or spaces filled with material different from that making up the board or cylinder, and more specifically to a novel extrusion molding process for the production of synthetic resin board or cylinders having hollow or filled spaces which extend throughout the length of the board or cylinder, or separate air cells formed between its sides or surfaces., Up to now, for light weight articles a so-called sandwich type construction has been employed in which a core member such as paper honeycomb, synthetic resin honeycomb or synthetic resin cellular material is bonded on both sides to sheets of synthetic resin so as to form an article having a multi-ply construction. However, the process for the production of such a multi-ply article is complicated and expensive, and, furthermore, such a construction has the disadvantage that the core member tends to separate from the sheets making up the surfaces (sides) of the article.

In addition to the above described prior art process, several other types of processes are known. For example, one-piece synthetic resin board articles have been produced by a rolling process in which thermally melted synthetic resin material is forced between a plurality of cooled rolls thereby being cooled and set, or by the extrusion molding process in which molten synthetic resin material extruded from an extruding die device is placed in contact with the surface of a stationary metallic plate, thereby being cooled and set, or alternatively, a sheet of thermally softened synthetic resin material is cooled by jets of cool water or air to a predetermined temperature and thereby set. However, for the production of synthetic resin board articles having a complicated inner construction as hereinafter described, any of the known processes are not practicable because such articles tend to be easily deformed in handling and the cellular raw material constituting the synthetic resin board has very low heat conductivity and the result is poor cooling efficiency. In addition to the above disadvantages, since the cooling velocity ratio between the outer surface area and the area of the inner spaces is great, the rate of contraction between various portion of an article differ greatly with the result that, in the cooling-plasticizing stage, variations may occur in the thickness of the outer surface or side areas of the article thereby making it impossible to maintain the desired shape and dimensions in the finished article.

The above mentioned disadvantages inherent in the prior art processes are eliminated by the novel process of the present invention which comprises the steps of imparting a suitable cooling velocity to the various elements of a synthetic resin board in order to cool all of said elements at a uniform cooling velocity by forcing air at suitable pressure through air passages formed in the extruding die device into the spaces in the core in order to prevent deformation thereof during the cooling operation thereby expanding the board so as to bring the surfaces of the extruded synthetic resin board in contact with the surfaces of metallic plate members suitably positioned for cooling-setting the extruded board in the desired form and, in addition, providing an excess of material on the edges of said board so as to prevent deformation thereof while cooling.

Still other objects, features and attendant advantages will become apparent to those skilled in the art from a reading of the following detailed description of preferred embodiments of the process and of apparatus suitable for carrying out said process in accordance with the present invention in conjunction with the accompanying drawings.

Figure 3:
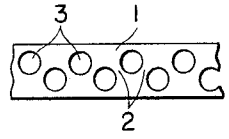
Figure 4:
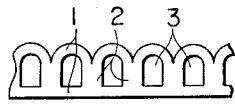
Figure 5:
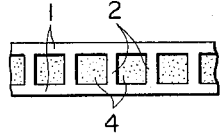
Figure 6:
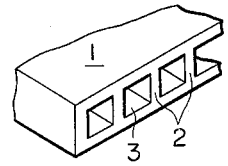
FIG. 6 is a partial perspective view of the board shown in FIG. 2.
Figure 7:
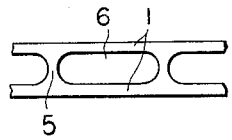
FIGS. 7 and 8 are partial longitudinal views in section of boards made by modifying the process of the present invention to provide partition or isthmuses in the spaces of said articles in the longitudinal direction thereof.
Figure 9:
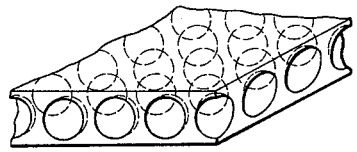
FIG. 9 is a partial perspective view of a board having spherical-like air-cells made by another modification of said novel process.
Figure 10:
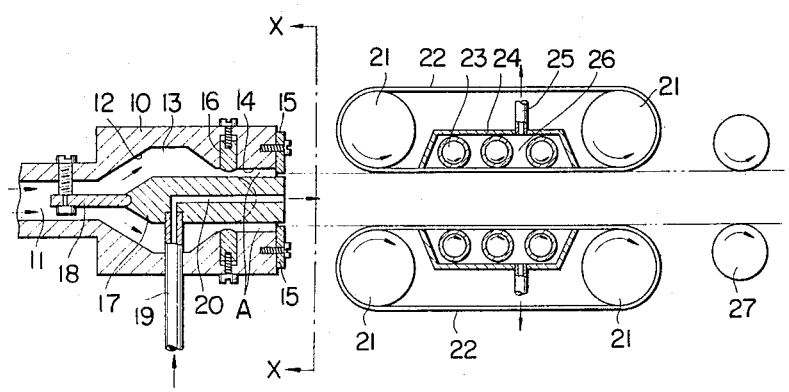
FIG. 10 is a side elevational view of a typical extruding machine constructed in accordance with the present invention showing part thereof in section.
Figure 11:
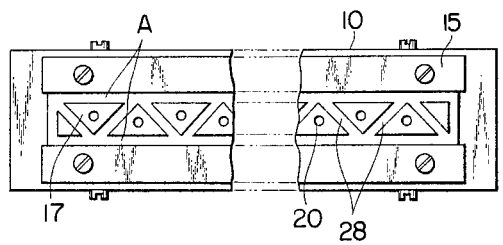
FIG. 11 is a view of part of the machine taken along the line X—X of FIG. 10 with a portion thereof taken away in order to clearly show the inner construction of the part.
Figure 12:
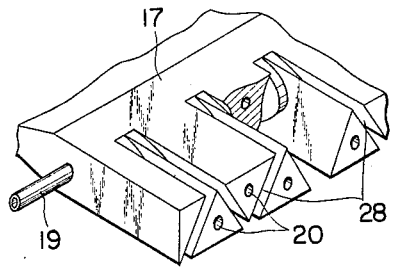
FIG. 12 is a perspective view of the pilot which constitutes part of the extruding machine as shown in FIG. 10.

Referring now to the accompanying drawings, and especially to FIGS. 1 through 4 which sectionally illustrate several types of the synthetic resin board produced by the novel process of the present invention. In these figures, numeral 1 designates both sides or boundary layers of the above-mentioned various synthetic resin boards and the sides or surfaces 1 are formed by extrusion molding with integral intermediate wall members 2 provided therebetween so as to define a plurality of spaces 3 therebetween. The spaces 3 open at both ends at right angles with respect to the plane of these figures and the configuration of these spaces 3 may be varied by changing the contour or placement of the intermediate wall members 2. In the boards shown in FIGS. 7 and 8, the spaces 3 extending throughout the core are divided into separate air-cells 6 as defined by partition walls 5 provided at predetermined intervals in the longitudinal direction of the respective spaces 3 or the spaces 3 are provided with isthmuses or ribs 7 at predetermined intervals in the longitudinal direction thereof in order to improve the elasticity and mechanical strength of the finished synthetic resin board. In the board of FIG. 9, the separate air-cells shown in FIG. 7 are reduced in size and are shown of spherical shapes spaced about equidistantly from each other. In the board of FIG. 5, the spaces mentioned above with respect to the core of FIG. 1 are filled with either solid or vesicatory filler selected from organic or inorganic substances. However, this novel process is equally applicable to articles having cross sectional forms other than those illustrated. In FIGS. 10 through 12, one embodiment of an extruding machine suitable for the production of synthetic resin board in accordance with the process of the present invention is shown. As seen from these figures, the machine comprises an extruding head 10 provided with a coaxial extruding outlet 14 having a fixed width and opening in the lateral direction (as seen in FIG. 10), a material inlet 11 disposed in the rear of said extruding head for receiving molten synthetic resin material, an extrusion chamber 13 communicating with said inlet and outlet and defined by the tapered bore 12 of said head 10, adjusting means 16 disposed midway between the outlet 14 and extrusion chamber 13 for adjusting the magnitude of the spaces A defined by the inner surfaces of the head and a pilot (as hereinafter described), control plates 15 provided in the front of said head for controlling the width at the outlet side of the spaces A, and a pilot 17 disposed within the head 10 in the vicinity of the outlet 14 and having such a thickness that the magnitude of each space A may become equal to the thickness of the individual side or surface of the board to be formed by the machine. As illustrated in FIG. 12, the pilot 17 may have an end configuration corresponding to the cross sectional configuration desired in the finished board to be produced and is provided with grooves 28 forwardly extending at a predetermined angle and having a predetermined depth. An air passage 20 is provided extending through the individual member defined by each two adjacent grooves 28 and these air passages 20 communicate with a common air pipe 19 which is adapted to be supplied with air from any suitable air supply source outside. In FIG. 10, the pilot 17 is shown as being supported by a wing piece 18, but the pilot 17 may be held in position by means of bridges extending inwardly respectively from the upper and lower surfaces of the head 10.

A pair of opposing metallic endless belts 22 are supported in a predetermined space relation by rotatable rolls 21 in front of the head 10 so as to be driven in the same direction by the rolls and each of the belts 22 has a plurality of small holes therein in order to shape the extruded board to a desired dimension and cool the same. The position of the rotatable rolls 21 is adjustable. In order to maintain the pair of endless belts 22 at a predetermined position and to prevent the board from sticking to the belts and being moved thereby, suction chambers each of which comprises a plurality of cooling rolls 23 cooled by air or water and which communicate with an exhaust pipe 25 are provided for each of the belts. In FIG. 10, a pair of endless belts 22, 22 and a pair of suction chambers 26, 26 are shown, but as described hereinafter in detail, if desired, only one belt and only one suction chamber may be operated. And in this case, the other suction chamber 26 and its associated cooling rolls 23 may be allowed to race. Furthermore, the above mentioned endless belts may be so constructed that they may be driven at various fixed velocities or for reason as hereinafter described, their travelling movement may be intermittently stopped after a fixed number of rotations. In FIG. 10, numeral 27 designates guide rolls for advancing the formed board to a predetermined picking up station.

Figure 1:
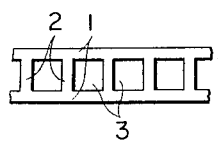
FIGS. 1 through 5 are sectional views of parts of several types of synthetic resin board made by the process of the present invention.
Figure 2:
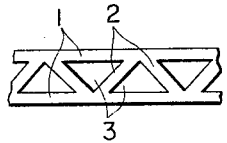

In the operation of this embodiment of extruding machine, heat-molten synthetic resin material is injected under pressure through inlet 11 into the extruding machine and the resin material is divided into two portions, upper and lower, by the wing piece 18, but converge into a single body as the portions leave the chamber 13 and then simultaneously pass through the spaces A for forming the sides 1 and through the inclined grooves 28 for forming the intermediate wall members 2 of a desired board whereby board having a desired configuration of spaces defined by the sides and wall members is extruded. As the board is being extruded out of the extruding machine, a suitable amount of air under a predetermined pressure is supplied into the individual spaces 3 by way of the respective air passages 20 of the member defined by the grooves 28 in order to prevent the extruded board from shrinking and in this case the board is sucked to the opposing pair of endless belts 22 and carried by the belts at a constant velocity while its thickness is being controlled. As the board is being moved in this way, it is cooled by cooling rolls 23 and stabilized at the desired thickness, and the extruded board having a series of spaces 3 extending throughout its length in the direction of extrusion with sides 1 of a smooth predetermined thickness as shown in FIGS. 1 through 3. The cellular or striated board so formed is advanced to a predetermined picking up station by means of rolls 27 and cut into desired lengths for use. The thickness ratio between the sides 1 and intermediate wall members 2 may be varied by varying the space between the pair of endless belts 21 21 and the amount of air to be supplied into the spaces 3, regardless of the end configuration of the pilot 17; when the rotatable rolls 21 adjacent to the extrusion outlet 14 are heated to a suitable temperature the heated rolls are especially helpful in controlling any deformation taking place in the extruded board and at the same time stabilizing its dimensions. It is also within the scope of the present invention to round off the pilot 17 of the above extruding machine so as to provide a construction having a plurality of spaced circular members corresponding to the size of the air passages 20 whereby a board having a cross section configuration as shown in FIG. 3 is obtained.

Figure 8:
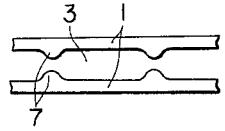

In the operation mentioned above, if the travelling movement of the opposing pair of endless belts 22 is intermittently stopped at predetermined intervals or the rate of picking-up the product therefrom is reduced, partitions 5 or isthmuses 7 will be formed in the board as it is extruded out of the die device comprising the extrusion head 10 and pilot 17 as its principal components, as illustrated in FIGS. 7 or 8. The air which is trapped in each cell 6 as it is formed by the formation of the transverse partitions 5 is of the same pressure on both sides of the partition and thus does not rupture the partition. The synthetic resin board having the separate air-cells 6 as shown in FIG. 7 especially possesses the advantage of great springiness. Furthermore, when shot jets of air under low pressure are supplied through many air passages the cross section of the board obtained will have a honeycomb configuration. In addition, if one of the opposing pair of endless belts is removed, and air is supplied in a suitable amount to the spaces 3 of the extruded board so as to expand the board as shown in FIG. 4, the side stuck to and carried by the endless belt will assume a flat surface whilst the other side which had not been stuck to the belt will take a rugged surface 1'. And if any suitable filler material is supplied through the air passages 20 into the respective spaces 3 in place of air, a synthetic resin board having filled spaces as shown in FIG. 5 may be obtained.

Figure 13:
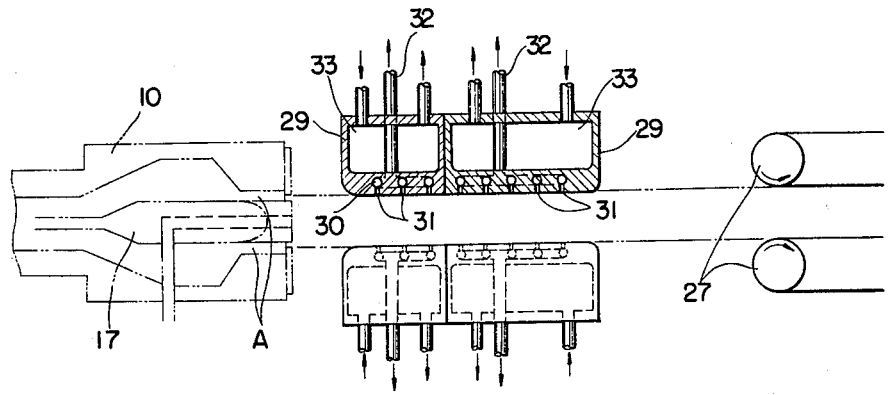
FIG. 13 is a vertical sectional view of a setting-shaping device to be employed in conjunction with the extruding machine as shown in FIG. 10.

In the modified embodiment of the extrusion machine shown in FIG. 13, a stationary cooling-shaping device 29 is provided in place of the cooling-shaping device comprising the endless belts 22, cooling rolls 23 and suction chambers 26. The board which has been extruded through the spaces A is frictionally guided in contact with the contacting surface of the cooling-shaping device 29 whose position is adjustable along a plane parallel to the plane of this figure. An exhaust pipe 32 extending through across the cooling-shaping device 29 and the exhaust pipes communicates with air passages 30 and suction bores 31 of the cooling-shaping device 29 to generate a suction that pulls both sides of the board into contact with the surfaces of said cooling-shaping device so that the board is frictionally guided in contact with the contacting surface. As the board is moved along, the article is cooled by cooling air or temperature-controlled water which has been supplied to the cooling chambers 33 so the article may be set in its controlled dimension. In the extrusion machine of FIG. 13, the cooling-shaping device 29 is divided into two parts. The fore-part 29a is maintained at a temperature suitable to effectively cool the sides 1 of the extruded board while the rear-part 29b is maintained at a temperature suitable to effectively cool the intermediate wall members 2. The cooling-shaping device may be divided into two or more parts, if desired, so that the sides and intermediate wall members of the board may be cooled at varying cooling rates. Furthermore, the above contacting surface of the cooling-shaping device may be subjected to shot-peening or provided with a surface having small pits similar to those produced by shot-peening.

In the embodiment of the extrusion machine of FIG. 10, the extruded synthetic resin board is formed in direct contact with the endless belts, but if a layer of cloth, paper or synthetic resin is to be applied over the surface of the extruded board, such a finishing layer is inserted between the metallic endless belt and the synthetic resin board extruded through the die along the longitudinal direction of the belt so that the finishing layer can be laid on the board article.

Figure 14:
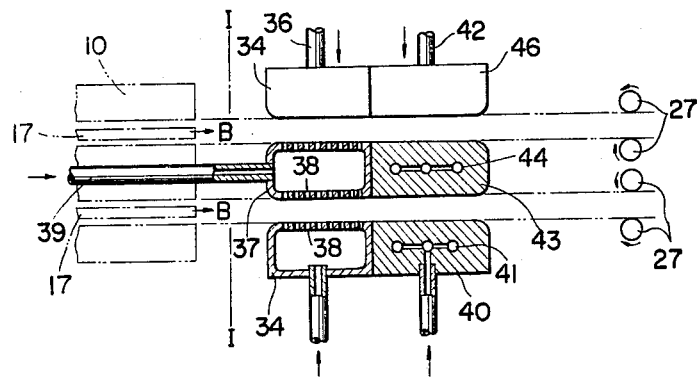
FIG. 14 is a vertical sectional view of another setting-shaping device which also serves to prevent the shrinking of the board while it is being cooled and which is to be employed in conjunction with a modified machine of the present invention.
Figure 15:
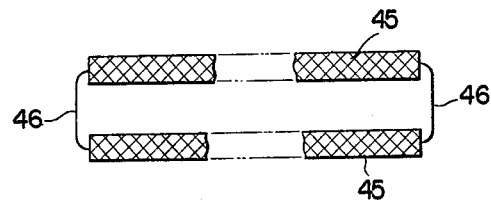
FIG. 15 is a cross sectional view of a product made by the employment of the setting-shaping device shown in FIG. 14.

The further modified embodiment of extrusion machine of FIG. 14, which is shown in section in FIG. 15 taken along the line I—I of FIG. 14, comprises an extrusion die having a pair of pilots 17, 17 which is adapted to extrude two bodies of synthetic resin board 45, 45 with excess material portions 46, 46 provided at both edges, the purpose of said excess material being to prevent deformation of the extruded board during cooling. The front cooling-shaping and rear cooling-shaping devices comprise a pair of outer cooling means 34, 40 respectively, and the position of these cooling means can be adjusted relative to their corresponding intermediate cooling means 37, 43, respectively. The front cooling-shaping devices 34, 37 are provided with their respective air passages 35, 38 to permit cooling air to pass through the cooling-shaping devices. Air pipes 36, 39 communicate with the respective air passages 35, 38 at one end and these air pipes in turn communicate with outer cooling air sources at the other ends (not shown). The rear cooling-shaping devices 40, 43 are provided with cooling water passages 41, 44 which communicate with outer cooling water sources, respectively. With the above construction, when the extruded board passes through the above cooling-shaping devices in the direction as indicated by the arrow B while the cooling air in a sufficient amount is being supplied thereon, both sides 1 of the synthetic resin board are cooled and set by the front cooling-shaping devices and at the same time the excess material portions 46 (FIG. 15) are also cooled and solidified, and the inner surfaces of said sides are restricted by the opposing sides of the intermediately disposed cooling device 37. Thus, the intermediate wall members 2 of the synthetic resin board 45 are cooled and set by the water-cooled rear cooling-shaping device as the article 45 is being prevented from shrinking or deforming by the solidified excess material portions 46, and the thus treated board is advanced toward a predetermined pick-up station by the rollers 27 where the excess material remaining is cut-off by any suitable means.

Figure 16:
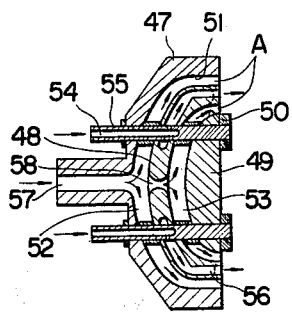
FIG. 16 is a cross sectional view taken along the axis thereof of an essential part of a further modified extruding machine, which machine is especially suitable for manufacturing a cylindrical article.
Figure 17:
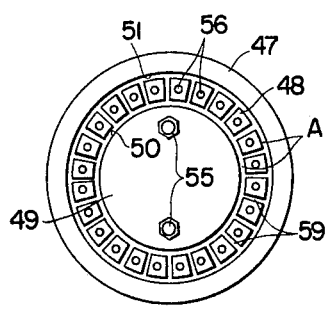
FIG. 17 is an end elevational view of the part shown in FIG. 16.
Figure 18:
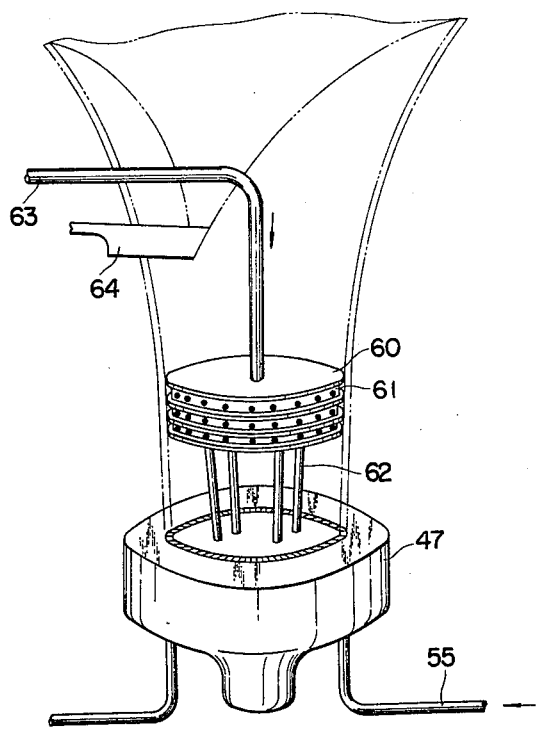
FIG. 18 is a view illustrating a cylindrical product being formed by the employment of the extruding machine shown in FIGS. 16 and 17.

FIG. 16 shows an extrusion die device suitable to be employed for the production of cylindrical configuration article and FIG. 17 is an end elevational view of the die device shown in FIG. 16. The extrusion die device comprises a cylindrical extrusion head 47 having an outer extrusion outlet 51 for defining the outer diameter of a cylindrical article to be produced, an insert disk member 49 having an inner extrusion outlet 50 for defining the inner diameter of said article, and a cylindrical pilot 48 comprising the elements as explained referring to FIGS. 10, 11 and 12 and having a cross section configuration for defining the desired cross section configuration for the cylindrical article to be formed, said pilot 48 being provided between the head 47 and insert disc member 49 leaving spaces A between the head and the pilot on one hand and between the disc member and the pilot on the other hand to define the extrusion chambers 52, 53 and thereby, the magnitude of each of said spaces A corresponding to the thickness of each of the sides of the synthetic resin article. The head 47, pilot 48 and insert disc member 49 are firmly held in position by air pipes 55 extending through these components and having center bores 54 extending therethrough respectively. The cylindrical pilot 48 is provided with a number of air passages 56 through which cooling air is supplied into the spaces of the cylindrical synthetic resin article. The number of said air passages 56 corresponds to that of the spaces to be formed between the sides of the article. Cooling air is supplied to many nozzles 56 by air pipes 55 provided with bore 54 therein, the air being fed from an air supply pipe. When thermally molten synthetic resin material is supplied from a separate extrusion machine through inlet 57, a portion of molten resin material goes to extrusion chamber 52 and the remainder passes through the center bore of pilot 48 into chamber 53 to fill spaces A and grooves 59 and is then extruded out of the die device as a continuous cylindrical article with spaces 3 formed between its peripheral surfaces. The die device is employed in conjunction with a cooling-shaping device generally indicated by numeral 60 in FIG. 18. As shown in FIG. 18, the cooling-shaping device 60 is supported by stays 62 and comprises a nozzle or slotted member 61 which is supplied with cooling air through a cooling air pipe 63 from an outer air source whereby the cylindrical article may be reshaped to a desired diameter. Immediately after having been extruded from the die device, if the cylindrical synthetic resin article is cut open at any desired point in the periphery thereof along the axis thereof by means of a suitable cutting device 64 and the cut article is cooled and set in a desired form, for instance, in a flat form, a flat synthetic resin board article having both flat sides or one flat side as mentioned above in connection with FIGS. 1 through 8 may be obtained as well as a cylindrical shape article.

When employed in combination with the extrusion die device shown in FIGS. 16 and 17, the cooling-shaping device of FIG. 18 serves to enlarge the diameter of the cylindrical article to any desired dimension and thereafter to set the same in the enlarged dimension or to cut open the cylindrical article to reshape the same into a flat article as desired. The device generally indicated by numeral 60 and having the nozzle or slotted member 61 communicating with cooling air pipe 63 serves as a cooling-shaping device which is capable of enlarging the cylindrical article to a desired diameter and of setting the article in the enlarged state. The cooling-shaping device 60 is secured by means of the stays 62 to the extrusion head 47. Any adjustment of amount of the cooling air flowing through the cooling air pipe 63 provides any adjustment of the dimension for the cylindrical article. Also in the embodiments as shown in FIGS. 16, 17 and 18, it is clear that as in the case of the embodiment of FIG. 10, the pilot 48 may be provided with only a plurality of spaced air passages 56 thereby to form articles having the cross section configuration as shown in FIGS. 3, 7 8 and 9.

In the foregoing, description has been given of horizontally arranged devices, but vertically arranged devices can be equally employed for carrying out the novel process of the present invention.

From the above, it will be understood that the present invention provides a novel, economical and highly efficient process and apparatus for the production of synthetic resin board or cylindrical articles having desired cross section configurations including either hollow or filled spaces therein desired dimensions and surface shapes. The novel process and apparatus also make it possible to produce synthetic resin board articles having independent air-cells therein which impart elasticity to the articles or having suitable partitions or isthmuses by which the produced articles are strengthened. The synthetic resin articles obtainable by this novel process and apparatus can be employed for many purposes, for example, as packing, insulation, construction material, decorations and other applications; because of the excellent sound-absorbing, damp-proofing, shock-absorbing and adiabatic properties of the finished resin products, they provide many advantages in their practical applications.

What is claimed is:

1. A method for making a resin board having a cellular structure of spaced spheres comprising the steps of extruding a thermoplastic resin in the cross-section selected, and injecting air into the extruding resin at spaced intervals of time to form said spheres.

2. A method for making a resin board having spaced boundary layers and a plurality of cells therebetween comprising the steps of continuously extruding a thermoplastic resin to produce a plurality of longitudinally extending chambers between spaced boundary layers, continuously injecting air under a predetermined pressure into the chambers formed by the extruding resin, stopping the movement of the extruded shape for a predetermined time while continuing to extrude resin to thereby form a dividing wall in each chamber defining one wall of a cell, then moving the extruded mass a distance equal to the preselected length of cell and forming additional dividing walls by stopping movement of the extruded shape for a predetermined time while continuing to extrude resin, and continuing the formation of dividing walls as aforesaid for the length of the board.

3. A method for making a resin board having spaced boundary layers, a plurality of longitudinal walls extending between and integral with said layers and reinforcing ribs at spaced locations longitudinally of the board and integral with the layers and walls comprising the steps of continuously extruding a thermoplastic resin to form spaced boundary layers and a plurality of longitudinal walls integral therewith to define longitudinally extending chambers, continuously injecting air under a predetermined pressure into the chambers formed by the extruding resin, stopping movement of the extruded shape for a predetermined time at the side of each rib while continuing to extrude resin to thereby form the ribs adjacent the stopped shape.

References Cited by the Examiner
UNITED STATES PATENTS

| | | | |
|---|---|---|---|
| 1,152,978 | 9/1915 | Royle. | |
| 1,780,948 | 11/1930 | Sherman | 264—209 |
| 2,428,555 | 10/1947 | Cummins et al. | 264—177 |
| 2,748,401 | 6/1956 | Winstead | 18—14 |
| 2,760,228 | 8/1956 | Verges | 264—209 |
| 2,788,543 | 4/1957 | Dinsch. | |
| 2,834,045 | 5/1958 | Davies | 264—50 |
| 2,954,588 | 10/1960 | Soubier | 264—209 |
| 3,000,144 | 9/1961 | Kitson | 50—268 |
| 3,001,333 | 9/1961 | Piana | 50—268 |
| 3,054,714 | 9/1962 | Johnston | 264—90 |
| 3,103,409 | 9/1963 | Bohres et al. | 264—209 |

ROBERT F. WHITE, *Primary Examiner.*

ALEXANDER H. BRODMERKEL, *Examiner.*

J. R. DUNCAN, S. A. HELLER, *Assistant Examiners.*